United States Patent Office
3,338,631
Patented Aug. 29, 1967

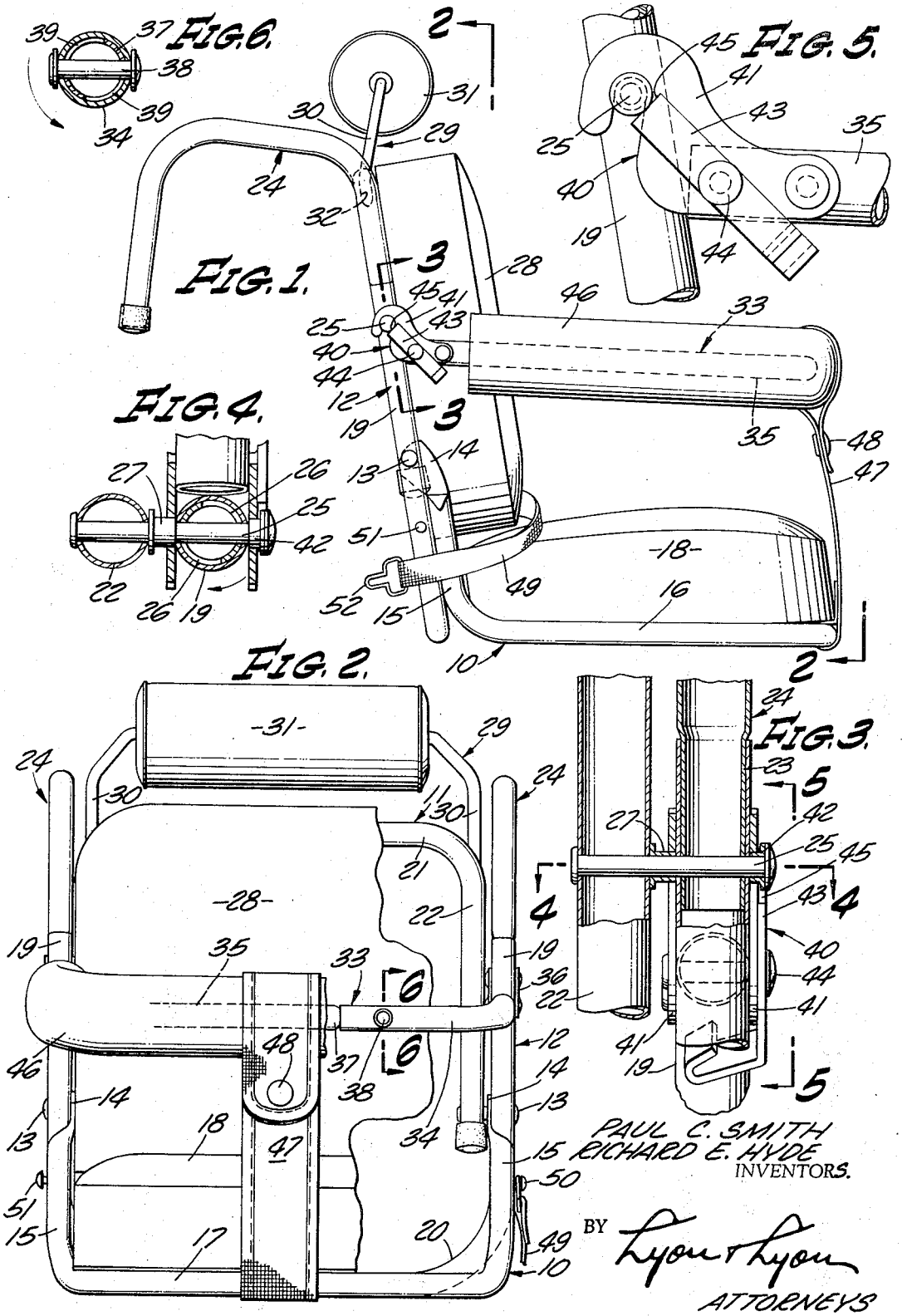

3,338,631
INFANT'S CAR SEAT
Paul C. Smith, Pacific Palisades, and Richard E. Hyde, Palos Verdes Estates, Calif., assignors to Strolee of California, Inc., Los Angeles, Calif., a corporation of California
Filed Dec. 30, 1965, Ser. No. 517,779
2 Claims. (Cl. 297—256)

ABSTRACT OF THE DISCLOSURE

A car seat for infants having an improved structural frame providing increased rigidity although still collapsible; having a headrest the height of which is easily adjustable; and having a guard rail made in two sections with one end detachable so that the side of the guard rail may be lowered or raised so that the infant can be more easily placed in or removed from the seat.

---

The present invention relates generally to small seats for infants or children which can be used in automobiles. More specifically, the present invention relates to certain improvements in car seats which make them easier to handle and safer to use.

Car seats which have been manufactured in the past, have ordinarily employed some type of frame having hooks designed to extend over the back of a seat so that the car seat may be temporarily but securely mounted. Such car seats have also included some sort of guard rail which extends around the front of the seat to keep the infant from falling out. There are a number of difficulties with such car seats because many of them are not convenient to handle or safe to use. For example, with the guard rail in position, it is frequently awkward to place a child in the seat or to remove him. In addition, the guard rails are ordinarily quite hard and present a safety hazard to small children who may bump their heads on them. In order to make these car seats strong enough to support children, they are ordinarily constructed rigidly so that they become quite bulky and inconvenient to handle or store.

It is the general object therefore of the present invention to provide an infant's car seat combining the utmost in safety with convenience of handling.

More specifically, it is an object of the present invention to provide a car seat in which the child can be easily and quickly seated or removed.

It is another specific object of the present invention to provide a car seat having padding to increase safety.

It is another object of the present invention to provide a car seat having a removable headrest to prevent serious injury from whiplash or the like.

It is still another object of the present invention to provide an infant's car seat which will have maximum strength using a minimum number of parts.

It is another object of the present invention to provide an infant's car seat which folds compactly without sacrificing its rigidity when in use.

Further objects and advantages of the present invention will become apparent upon reading the following description in conjunction with the drawings, in which:

FIGURE 1 is a side elevation of an infant's car seat employing the improved features of the present invention.

FIGURE 2 is a front elevation of the car seat, partially broken away, taken along line 2—2 of FIGURE 1.

FIGURE 3 is a partial, sectional view of the guard rail catch mechanism taken along line 3—3 of FIGURE 1.

FIGURE 4 is a sectional plan view of the catch mechanism taken along line 4—4 of FIGURE 3.

FIGURE 5 is a side elevation of the catch mechanism taken along line 5—5 of FIGURE 3.

FIGURE 6 is a sectional elevation of the guard rail mounting taken along line 6—6 of FIGURE 2.

Turning now to the details of the drawings, the car seat is constructed of tubular frame members including the lower seat member 10, an upper backrest member 11 and a back connecting member 12. As shown in FIGURES 1 and 2, the lower seat member is pivotally attached to the back member 12 by means of the pins 13 extending through back member 12 and through an offset hinge portion 14 of the seat member 10. The seat member 10 consists of the two substantially vertical portions 15 which have the offset hinged portions 14, and the remainder of seat member 10 is bent and extends forwardly forming the side portions 16 joined by the front portion 17 thereby providing a plane upon which the seat cushion 18 is mounted.

The tubular connecting member 12 consists of two substantially vertical side portions 19 and a horizontal bottom portion 20, all of which lie in substantially the same vertical plane. The backrest member 11 is similarly U-shaped, and includes the upper horizontal portion 21 and depending side portions 22.

At the upper end of each of the side portions 19 of the back member 12, there is inserted an end 23 of the seat hooks 24. The seat hooks 24 are also constructed of tubular stock of substantially the same diameter as the rest of the frame of the car seat, but the ends 23 are reduced so that they telescope within the ends of the side portions 19 as shown in FIGURES 3 and 4. A latch pin 25 extends through portion 19 and through radial slots 26 in the hook ends 23, and then through the depending backrest portions 22. A spacer 27 is inserted between portions 22 and 19 for reasons which shall become apparent hereafter. The seat hooks 24 are curved in a usual manner so that they can extend over the back of an automobile seat. The arcuate slots 26 in the end portion 23 are provided to permit the seat hooks 24 to pivot approximately 90° with respect to the side portions 19 so that seat hooks 24 can be positioned either as shown in FIGURE 1, extending straight back away from the car seat itself, or can be folded inwardly flat against the back of the device.

In its unfolded position as shown in FIGURES 1 and 2, it will be noted that the upward extending portions 15 of the seat member 10 bear against the lower part of the portions 19 thereby forming a rigid structure, permitting the seat member 10 to be pivoted upwardly when the seat is folded. The backrest member 11 forms a plane against which the backrest cushion 28 is securely attached.

A headrest supporting bracket 29, having the two depending portions 30, carries a padded headrest 31 thereon. The depending portions 30 extend into apertures 32 in the backrest supporting member 11, and extend substantially coaxially with the portions 22 thereof. The depending portions 30 are not rigidly secured in apertures 32 so that the height of the headrest 31 may be readily adjusted or the headrest may be removed altogether if desired.

A substantially horizontally positioned guard rail 33 is mounted in a position spaced above the level of the seat cushion 18. Guard rail 33 consists of two tubular sections 34 and 35 as shown in FIGURE 2. Section 34 is attached to a bracket 36 which in turn is pivotally mounted to one of the back connecting portions 19. Both of the sections 34 and 35 of the guard rail 33 are constructed of tubular stock but the portion 35 has a necked down end 37 so as to telescope into the end of section 34 where they are joined by the pin 38 which extends therethrough. As shown in FIGURE 6, annular slots 39 are provided in the necked portion 37 permitting the guard rail section 35 to pivot approximately 90° with respect to section 34.

At the other extremity of guard rail section 35, there is secured a guard rail catch 40. The catch 40 comprises a pair of hook plates 41 rigidly secured to each side of the rail section 35. These hook plates 41 are adapted to extend over and engage the latch pin 25, and a second spacer 42 is provided between the head of pin 25 and the portion 19, similar to the spacer 27, to assure that there will be room to insert the hook plates 41 thereover. A latching bar 43 is pivotally mounted near the end of the rail section 35 by the pin 44 and is adapted to pivot upwardly so that its end 45 engages the latch pin 25 thereby securing the guard rail catch 40 in position on the back connecting member 12.

The entire guard rail 33 is surrounded by reasonably thick padding 46 in order to help prevent injury to the infant. In its lowered position, as shown in FIGURE 1, the guard rail 33 will drop no further than the position substantially as shown, since the end of section 35 abuts against the portion 19 as can be seen in FIGURE 5. Likewise, the extremity of section 34 will abut against the opposite side portion 19. In order to keep the guard rail 33 in its lowered position, a center strap 47 is secured to the front section 17 of seat support member 10 and extends upwardly and over the padded portion 46 of guard rail 33. In order that the structure can be conveniently folded, the strap 47 is secured by a tab snap 48 which can be easily unfastened.

As an added safety feature, an adjustable safety belt 49 is secured to the side portions 19 of back member 12 by the pins 50 and 51. The customary releasable belt buckle used for large safety belts is quite cumbersome and bulky, and therefore not satisfactory for use with infants. In order to provide a quickly releasable safety belt which is still adjustable, the end of the belt 49 is provided with a keyhole wire catch 52 which will snap quickly and securely over the shank of the pin 51. A slide buckle of ordinary design is then provided in the belt 49 to adjust for size.

It will thus be seen that the present invention provides an extremely rigid seat for infants, but one which can be easily folded into a compact package. By pivoting inwardly the seat hooks 24, releasing the tab snap 48, pivoting the guard rail 33 upwardly over the headrest 31, and then pivoting the seat support member 10 upwardly, the resultant thickness of the package is not substantially greater than the thickness of the backrest cushion 28 and seat cushion 18. In addition, when unfolded for use, a child can be easily placed in the seat by unfastening the guard rail catch 40 and pivoting the section 35 downwardly to a vertical position, whereupon the child can be slid into the seat from the side after which the guard rail is replaced firmly in its position. Once the seat belt 49 is adjusted for the proper size and fit for an infant, the belt can be repeatedly removed and reattached by means of the wire clip 52 and no readjustments are necessary.

While a particular embodiment of the present invention has been shown and described, it will be obvious to persons skilled in the art that changes and modifications may be made without departing from the invention in its broader aspects. It is the aim of the appended claims to cover all such changes and modifications as fall within the true scope and spirit of the invention.

We claim:
1. An infant's collapsible car seat comprising in combination:
   a lower seat member, a lower seat cushion mounted upon said lower seat member, said lower seat member having a horizontal portion and two upright ends, said ends having hinge pieces thereon laterally offset with respect to said ends, said hinge pieces have hinge pins thereof offset with respect to said ends;
   a substantially vertical back connecting member, said hinge pieces pivotally attached to said back connecting member, said hinge pieces affixed at a point along the vertical extent of said back connecting member so as to permit substantial abutment between said upright ends and said back connecting member when said horizontal portion of said lower seat member is in an unfolded position, said vertical back connecting member further having a plurality of seat hooks rotatably mounted upon said back connecting member;
   an upper backrest member, means securing said backrest member to said back connecting member, a backrest cushion mounted upon said backrest member;
   a headrest, means for mounting said headrest upon said backrest supporting member; and
   a guard rail, said guard rail comprising two sections pivotally connected together, each section pivotally attached to said back connecting member, one side of said guard rail having catch means for removably attaching said guard rail to said back connecting member, said guard rail having padding thereon.

2. An infant's car seat of the type described in claim 1 wherein said guard rail comprises first and second sections, said first section having a necked down end, said necked down end fitting coaxially within the cooperating end of said second section in telescoping relationship, means retaining said sections in said telescoping relationship, said means operative to permit said first section to rotate relative to said second section, said catch means being attached to said first section.

References Cited

UNITED STATES PATENTS

| | | | |
|---|---|---|---|
| 927,531 | 7/1909 | Hedstrom | 297—397 |
| 1,853,848 | 4/1932 | Cross | 297—250 |
| 2,723,709 | 11/1955 | Welsh | 297—255 |
| 3,126,226 | 3/1964 | Johnson | 297—254 |
| 3,132,896 | 5/1964 | Hamilton et al. | 297—256 |
| 3,146,026 | 8/1964 | Berlin | 297—255 |
| 3,170,727 | 2/1965 | Peterson | 297—256 |
| 3,237,985 | 3/1966 | Goldberg | 297—256 |
| 3,245,717 | 4/1966 | Levy | 297—254 |

FRANCIS K. ZUGEL, *Primary Examiner.*